3,199,960
CHEMICAL APPARATUS FOR LARGE MASS FLOW RATES
Austen Edgar Sowerby, Howgate, Whitehaven, Cumberland, England, assignor, by mesne assignments, to Marchon Products Limited, Whitehaven, Cumberland, England, a British company
Filed Apr. 24, 1962, Ser. No. 189,746
Claims priority, application Great Britain, Apr. 25, 1961, 14,906/61
3 Claims. (Cl. 23—285)

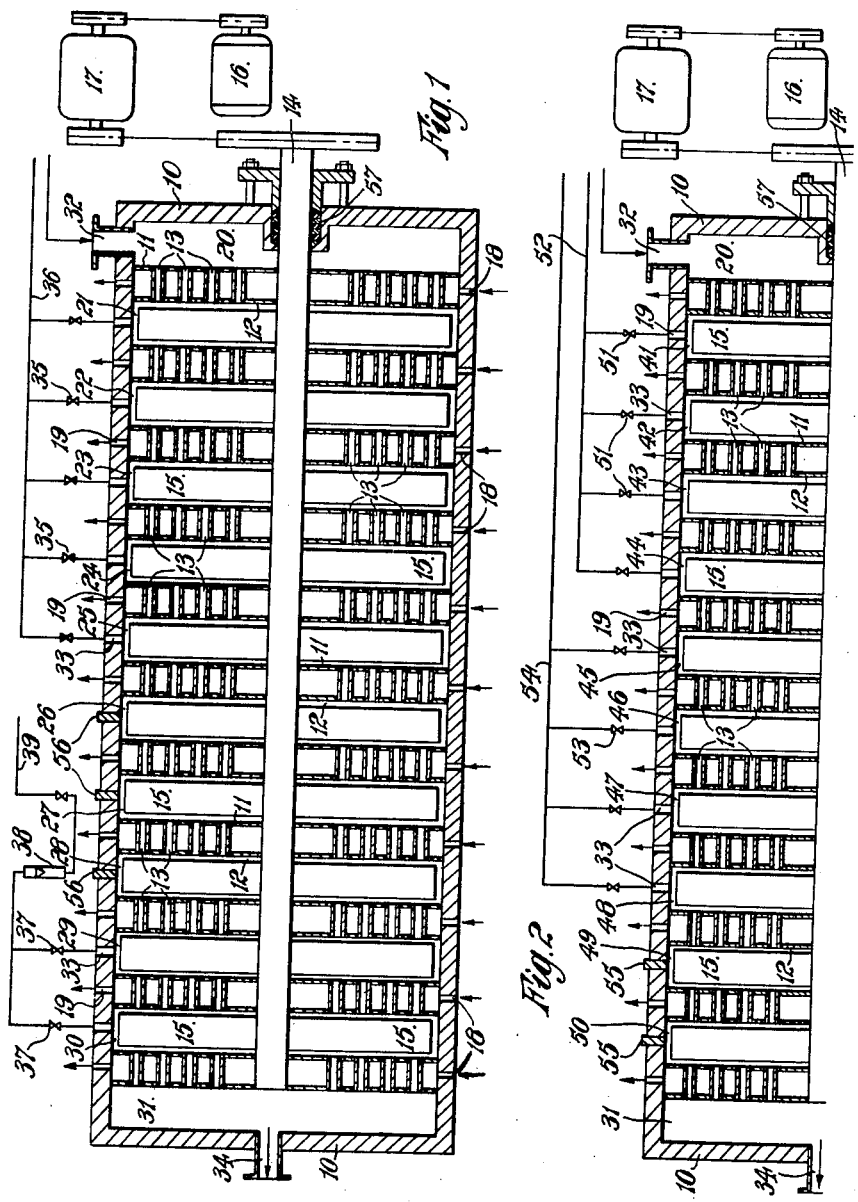

This invention relates to a method of and apparatus for carrying out in a continuous manner a chemical reaction involving a liquid reactant or reactants with or without a gaseous reactant, in such a manner that the reaction mixture is caused to flow freely through a vessel and that the stage reached by the reaction varies along the flow path, so that the composition of the reaction mixture differs materially from point to point along the length of the vessel. In such reactions the difficulty arises that the optimum temperature conditions at one stage and one composition of reaction mixture are not, in many cases, the same as the optimum conditions at another stage and composition. Particularly have we found this to be the case in the sulphation and sulphonation of so-called detergent raw materials (i.e., fatty alcohols and alkaryl hydrocarbons) using sulphur trioxide. Thus, we have found that in order to obtain products of good colour, it is necessary in this reaction to control the temperature quite closely, e.g., to a few degrees celsius, to values differing from point to point along the flow path of the mixture.

Hitherto control of the temperature of a reaction has generally been effected by transmitting heat through the walls of the reaction vessel, or by heat-exchanger coils within the vessel. In one prior proposal the vessel was divided into a number of chambers by hollow baffle plates having longitudinal passages for the reaction mixture, heat-exchange fluid being passed transversely through the hollow baffle plates. In no case, however, has there been provision for adjustment at will of different zones of the flow path to different, closely controlled temperatures. Insofar as the temperature varied along the flow path this would be inherent in the structural pecularities of the apparatus and the temperature at one point would not be controllable independently of the temperature at other points. In particular, none of the known reactors is capable of producing a satisfactory product in the sulphonation or sulphation of detergent raw materials by sulphur trioxide. This, of course, is also true of reactors or ovens having a catalyst or regenerator bed through which the reactants are passed at high temperatures in the gaseous phase, and the present invention is not concerned with that type of reactor, but only with reactors in which at least one of the reactants is liquid and there is free flow of the reaction mixture through the reactor.

According to one aspect of the invention there is provided a method of carrying out a chemical reaction which comprises causing a liquid or a liquid-gas reaction mixture to flow freely through a vessel, and introducing heat into or abstracting heat from the reaction mixture by means of surfaces in the path of the mixture and situated at a number of sections of the vessel transverse to the direction of flow of the mixture, so that the temperature of the reaction mixture can be maintained at desired values independent of each other throughout the flow path of the mixture.

According to a further aspect of the invention there is provided apparatus for carrying out the method described in the preceding paragraph, which comprises a reaction vessel, means for causing a liquid or liquid-gas reaction mixture to flow freely through the vessel, heat-exchange surfaces situated in the flow path of the reaction mixture at two or more sections of the vessel transverse to the direction of flow of the mixture, and means for controlling independently the temperatures of the said surfaces at the several sections of the vessel.

The heat-exchange surfaces may be regarded as dividing the reaction vessel into a number of reaction zones or chambers, it being understood that the elements are provided with apertures to allow free flow of the reaction mixture through the vessel.

As described more fully below, the apparatus and method of the invention are especially valuable for carrying out the sulphation and sulphonation of detergent raw materials by means of a mixture of sulphur trioxide and an inert gas by the process forming the subject of our copending patent application No. 189,745, filed April 24, 1962. In this reaction the sulphur trioxide-gas mixture is introduced into the flowing reaction mixture at a number of points along the flow path. A feature of the present invention is that inlets may be provided for feeding a gaseous reactant into some or all of the reaction chambers. Where, as in the case of the said sulphation or sulphonation, the reaction is such that a gas is required in a volume greatly exceeding that of a liquid reactant, a number of inlets may be provided for each chamber.

Where it is desired to supply heat to the reaction mixture, the heat exchange surfaces could be heated electrically. It is, however, generally preferred both for heating and for cooling to use a heat-exchange fluid, the heat-exchange surfaces then taking the form of heat-exchangers with separate flow passages for the reaction mixture and the heat-exchange fluid. In an advantageous form of the invention, the reaction vessel is divided in a manner known per se into reaction chambers by hollow baffle plates. Communication between the reaction chambers is provided by apertures in the baffle plates so that the reaction mixture flows freely through the reaction vessel. The baffle plates are provided with external tappings to permit the circulation of heat-exchange fluid through the space within each hollow baffle plate in a direction transverse to the flow path of the reaction fluid, the fluid circuits for the several baffles being independent of each other. In this way the reaction chambers are provided with heat-exchange surfaces to enable cooling or heating of the reactants to take place independently at desired locations along the flow path. Each reaction chamber may be fitted with an agitator to provide intimate mixing of the fluid reactants, all the agitators being mounted on a single shaft which passes through apertures in the centres of the baffle plates. The rate of flow and temperature of the heat-exchange fluid are so regulated in relation to the rate of flow of the reactant or reactants through the reaction vessel that the temperature of the reaction mixture is maintained at its optimum value for the various stages of the reaction. It will be noted that the form of heat-exchanger described above provides a large heat-exchange surface compared with a jacket heater or cooler. Moreover the ratio of heat-exchange surface to volume of reactor can be made unusually high.

By carrying out a chemical reaction according to the method described above and in the apparatus described above, it is possible to establish the temperature gradient between the reaction chambers which is most suited to the materials being processed, taking into consideration their physical properties, such as for example melting point and viscosity, which change during the course of the reaction. Owing to the temperature control provided by the transverse baffle plates, it is not necessary to provide external heating or cooling means for the reactant and this greatly facilitates the provision of a large number of inlets for a gaseous reactant where these are required. Furthermore outlets may easily be introduced at any of the reaction chambers to enable withdrawal of samples of the reaction mixture to determine the progress of the reaction, and thermometers may be introduced to measure the temperature in each of the reaction chambers.

An important advantage of the apparatus is that the apertures through the hollow baffle plates act as mixers for the reactants. This is particularly so when one of the reactants is a gas. Thus while the apertures must not be so small as to prevent free flow of the mixture, it is desirable that they be small enough to ensure turbulent flow therethrough. This not only improves mixing but also the heat-exchange taking place within the tubes forming the apertures.

As mentioned above, the method and apparatus of the invention are particularly suitable for carrying out the sulphation and sulphonation of detergent raw materials, such as lauryl alcohol and alkyl benzenes, with sulphur trioxide vapour. The sulphonation or sulphation of detergent raw materials with sulphur trioxide vapour has certain advantages over conventional techniques which employ reagents such as sulphuric acid, oleum and chlorosulphonic acid. In particular, the products of a reaction with sulphur trioxide, when converted to their neutral salts, are found to have a low content of inorganic salts, rendering them more suitable for use in liquid detergent formulations. Furthermore, the use of sulphur trioxide instead of the above mentioned conventional reagents in such reactions avoids undesirable and expensive effluents such as sulphuric acid and hydrogen chloride. However, the reaction using sulphur trioxide vapour is strongly exothermic and, as the reaction products are discoloured by excessive temperature conditions, such as may obtain at the point of entry into the reactor of the sulphur trioxide vapour, it is necessary to employ a method and apparatus which will ensure the absence of local over-heating at any time during the reaction.

In carrying out such a reaction batch-wise, it is necessary to hold the reaction mixture at a temperature above its maximum setting point and in contact with sulphur trioxide vapour for a considerable time with the result that an end product of inferior colour and properties is obtained. It has been proposed to carry out the process continuously, but in this proposal the apparatus consisted of a single reaction chamber. The apparatus of our invention provides a series of reaction chambers such that regulation of the reaction temperatures according to the viscosity and setting point characteristics of the reaction mixture is possible and the reaction is carried out progressively with absence of zones at excessive temperatures.

For example in the case of dodecyl benzene the viscosity, measured at 40° C., increases from about 12 centistokes to about 2000 centistokes over the period of addition of sulphur trioxide. In the case of a commercial lauryl alcohol the setting point was found to increase from 20° C. to 28° C. and then fall to a minimum of 9° C. before increasing finally to 20° C. towards the end of the addition of sulphur trioxide vapour.

Examples of a sulphonation and sulphation reaction according to the invention will now be described with reference to the accompanying drawing in which FIG. 1 is a diagrammatic sectional elevation of a reactor for the sulphonation of alkyl benzenes, and FIG. 2 is a similar view of the upper portion of a reactor for the sulphation of fatty alcohols.

Referring to FIG. 1, the reactor 10 is cylindrical in shape and is divided into twelve chambers by eleven hollow baffle plates, each of which consists of parallel perforated plates 11 and 12 and a plurality of tubes 13 welded into the perforations. A shaft 14 journalled in bearings 57 passes through all the plates 11 and 12, liquid-tight seals (not shown) being provided at each plate. Fixed on the shaft 14 are agitator blades 15, each of which is situated with a small clearance between adjacent hollow baffle plates. The shaft 14 is driven by a motor 16 through a variable speed gear box 17.

Each hollow baffle plate is provided with an inlet 18 and an outlet 19, each inlet and outlet being connected in an independent circuit (not shown) for the circulation of a cooling fluid, in the present case water.

The chambers into which the reactor is divided by the hollow baffle plates 11, 12, 13 comprise an inlet chamber 20, reaction chambers 21, 22, 23, 24, 25, 26, 27, and 28, quenching chambers 29 and 30 and an exit chamber 31. The inlet chamber 20 is provided with an inlet pipe 32 for the raw material to be sulphonated, in the present example dodecyl benzene. Each of chambers 21–30 is provided with a plurality of inlets such as 33 distributed round the circumference of the reactor wall. The exit chamber is provided with an outlet pipe 34 for the reaction product: dodecyl benzene sulphonate.

The inlets 33 of chambers 21–25 are connected via cocks 35 with a pipe 36 for the supply of a mixture of sulphur trioxide and dry air. The inlets 33 of chambers 26–28 are closed by plugs 56. The inlets 33 of chambers 29 and 30 are connected via cocks 37 and a rotameter 38 with a pipe 39 for the supply of quenching water.

The operation of the reactor shown in FIG. 1 will be described below under "Example 1."

Referring now to FIG. 2, like parts of which are denoted by the same reference numerals as those of FIG. 1, the hollow baffle plates 11, 12, 13 again divide the reactor 10 into twelve chambers. The latter comprise an inlet chamber 20, an exit chamber 31 and ten chambers 41–50. The fatty alcohol, in the present example lauryl alcohol, is supplied to chamber 20 by pipe 32, and the sulphated product is withdrawn from the exit chamber 31 by pipe 34.

The inlets 33 of chambers 41–44 are connected via cocks 51 with a pipe 52 for the supply of a certain mixture of sulphur trioxide and air. Inlets 33 of chambers 45–48 are connected via cocks 53 with a pipe 54 for the supply of a different sulphur trioxide/air mixture. Inlets 33 of chambers 49 and 50 are closed by plugs 55.

The operation of the reactor shown in FIG. 2 will be described below under "Example 2."

The invention is illustrated by the following examples.

*Example 1*

Dodecyl benzene was continuously supplied to the inlet chamber of the reactor shown in FIG. 1 at a rate of 200 lb. per hour by means of a proportioning pump, and passed, via the passages in the first hollow baffle plate, into the first reaction chamber No. 21. A gas stream containing 5% by volume of sulphur trioxide vapour and 95% of dry air was delivered to entry ports in the reaction chambers Nos. 21–25 at the rate of 7200 standard cubic feet per hour by means of a rotary compressor. The alkyl benzene, passing successively through each reaction chamber became progressively sulphonated, the ratio of sulphur trioxide to raw material increasing as the raw material was used up.

From reaction chamber No. 25, the reaction mixture passed into reaction chambers Nos. 26–28 (herein referred to as "maturing chambers") where absorption of sulphur trioxide from the carrier gas stream continued, thus reducing the content of un-sulphonated alkyl benzene in the reaction mixture to a low value. In this zone, cooling water was circulated through the baffle plates to reduce the reaction temperatures to 55°–60° C.

From the final maturing chamber, in which reaction was substantially complete, the reaction product, dodecyl benzene sulphonate, passed into the chambers Nos. 29 and 30 where it was intimately mixed with water supplied to these chambers at the rate of ½ gallon per hour by means of a proportioning pump. In this way any unreacted sulphur trioxide which may be present was destroyed. In this zone, the flow rate of the heat-exchange fluid was so regulated that the heat of dilution was removed and the temperature of the reaction mixture was 60°–65° C.

The mixture of carrier gas and dodecyl benzene sulphonate which issued from the exit chamber was fed directly into a neutralisation vessel where it was neutralised by aqueous alkali.

The reaction product was a white paste and had the following composition:

| | Percent |
|---|---|
| Sodium dodecyl benzene sulphonate | 43.2 |
| Unsulphonated oil | 1 |
| Sodium sulphate | 1 |
| Water | 55.46 |

*Example 2*

Commercial lauryl alcohol was continuously supplied to the inlet chamber of the reactor shown in FIG. 2 at a rate of 180 lb. per hour. A carrier gas stream containing 5% by volume of sulphur trioxide vapour and 95% of dry air was delivered at the rate of 5000 standard cubic feet per hour to reaction chambers Nos. 41–44 and a stream containing 2% by volume of sulphur trioxide vapour and 98% of dry air was delivered at the rate of 5500 standard cubic feet per hour to reaction chambers Nos. 45–48. The reactants flowed through the reaction vessel as described in Example 1.

About 70% of the lauryl alcohol was converted to lauryl sulphate in reaction chambers Nos. 41–44 and in reaction chamber No. 48 conversion to lauryl sulphate was nearly complete.

From the final reaction chamber No. 48 the lauryl sulphate passed into the reaction chambers Nos. 49 and 50 (herein referred to as "maturing chambers") where the temperature was reduced to 20°–22° C. at which temperature chemical and colour degradations of the lauryl sulphate were minimised.

The mixture of carrier gas and lauryl sulphate which issued from the exit chamber was passed into a continuous separator wherein the gaseous components were separated and led to an absorption tower. The liquid reaction product which issued from the separation was then neutralised with aqueous alkali. The reaction product was a pale yellow liquid containing approximately:

| | Percent |
|---|---|
| Sodium lauryl sulphate | 19.3 |
| Unsulphated fatty alcohols | 0.43 |
| Sodium sulphate | 0.98 |
| Water | 79.29 |

The conditions obtaining in the reaction chambers in the foregoing examples are set out in the following table:

It will be observed that the invention provides a useful means of terminating the reaction between sulphur trioxide vapour and a detergent alkylate, such as dodecyl benzene, by introducing a regulated flow of water or alkali solution into one or more chambers adjacent to the outlet port, so that unreacted sulphur trioxide in the reaction mixture is rapidly destroyed and a detergent sulphonate of improved colour and chemical stability is produced.

It will be understood that the number of reaction chambers shown in the drawings is purely illustrative. In practice the number of chambers and gas injection points will be dependent upon the size of the reactor and the output of product required. For example, in a reactor having 10 sq. ft. of heat-exchange surface and an output of 250 lbs./hour of product, 10 reaction chambers and between 25 and 50 injection points are preferred, whereas in a reactor having a cooling surface area of 70 sq. ft. and an output of 1700 lbs. product per hour, the best results are obtained with 25 reaction chambers and between 125 and 250 gas injection points. These numbers of gas injection points are totals for the whole reactor and are distributed equally over those chambers in which gas inlets are provided.

The ratio of heat-exchange surface to volume of reactor in the reactors according to the invention is high. In the reactors shown in the drawings this ratio is 30 sq. ft.: 1 cu. ft.

What I claim is:

1. Chemical apparatus adapted for large mass flow rates which comprises a reaction vessel; means for introducing a liquid reactant into said vessel at one end thereof, a series of hollow baffle plates arranged transverse to the length of the vessel and situated at a number of positions along the length of the vessel, each said baffle plate having a plurality of apertures extending in the longitudinal direction of the vessel for the flow of liquid therethrough whereby there are formed a series of interconnecting reaction chambers, each said baffle plate being provided with an inlet and outlet to the hollow space thereof for the passage therethrough of a heat-exchange fluid; separate fluid circuits for supplying the said heat-exchange fluid to the several hollow baffle plates whereby the temperatures of said baffle plates can be controlled independently of each other; separate inlet means for feeding a gaseous reactant into at least some of the said reaction chambers and agitator means provided in at least some reaction chambers, said reaction mixture flowing freely, without the formation of substantial pressure gradients therein, through the reaction vessel.

| Example | Chamber No. | SO₃ Carrier Gas Concentration, Percent | SO₃: Raw Material, Percent of Stoichiometric | Residence Time, Secs./100 | Temperature, °C. |
|---|---|---|---|---|---|
| 1 | 1 | 5 | 22.7 | 8 | 30 |
|  | 2 | 2.5 | 45.4 | 4 | 44 |
|  | 3 | 1.66 | 68.1 | 3 | 52 |
|  | 4 | 1.25 | 88.8 | 2 | 61 |
|  | 5 | 1.0 | 113.5 | 1.5 | 70 |
|  | 6 |  | 113.5 | 1.5 | 55–60 |
|  | 7 | 0.61 | 113.5 | 1.5 | 55–60 |
|  | 8 |  | 113.5 | 1.5 | 55–60 |
| Total |  |  |  | 23.0 |  |
| 2 | 1 | 5 | 17.5 | 9 | 35 |
|  | 2 | 2.5 | 35 | 5 | 40 |
|  | 3 | 1.66 | 52.5 | 3 | 45 |
|  | 4 | 1.25 | 70.0 | 2 | 30 |
|  | 5 | 0.433 | 77.5 | 2 | 25 |
|  | 6 | 0.355 | 85 | 1.5 | 22 |
|  | 7 | 0.30 | 92.5 | 1 | 24 |
|  | 8 | 0.262 | 101 | 1 | 25 |
|  | 9 | 0.15 | 101 | 1 | 22 |
|  | 10 | 0.1 | 101 | 1 | 21 |
| Total |  |  |  | 26.5 |  |